Feb. 13, 1934.  L. B. NEIGHBOUR ET AL  1,946,542
COTTON HARVESTER
Filed July 30, 1932  6 Sheets-Sheet 6
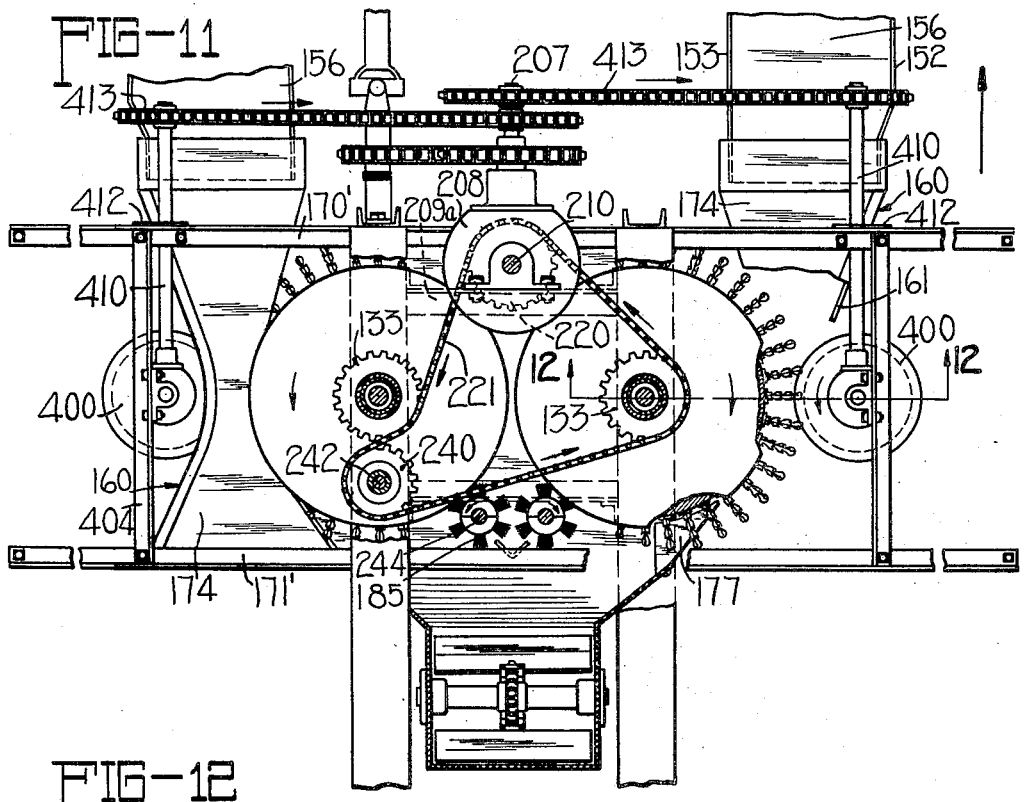
FIG-11
FIG-12
FIG-13
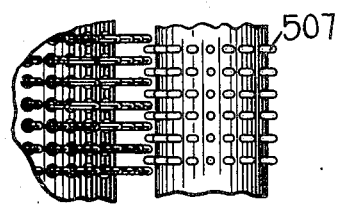
INVENTORS
Leonard B. Neighbour,
Frederick A. Thomann
BY Brown, Jackson,
Boettcher & Dienner
ATTORNEYS.

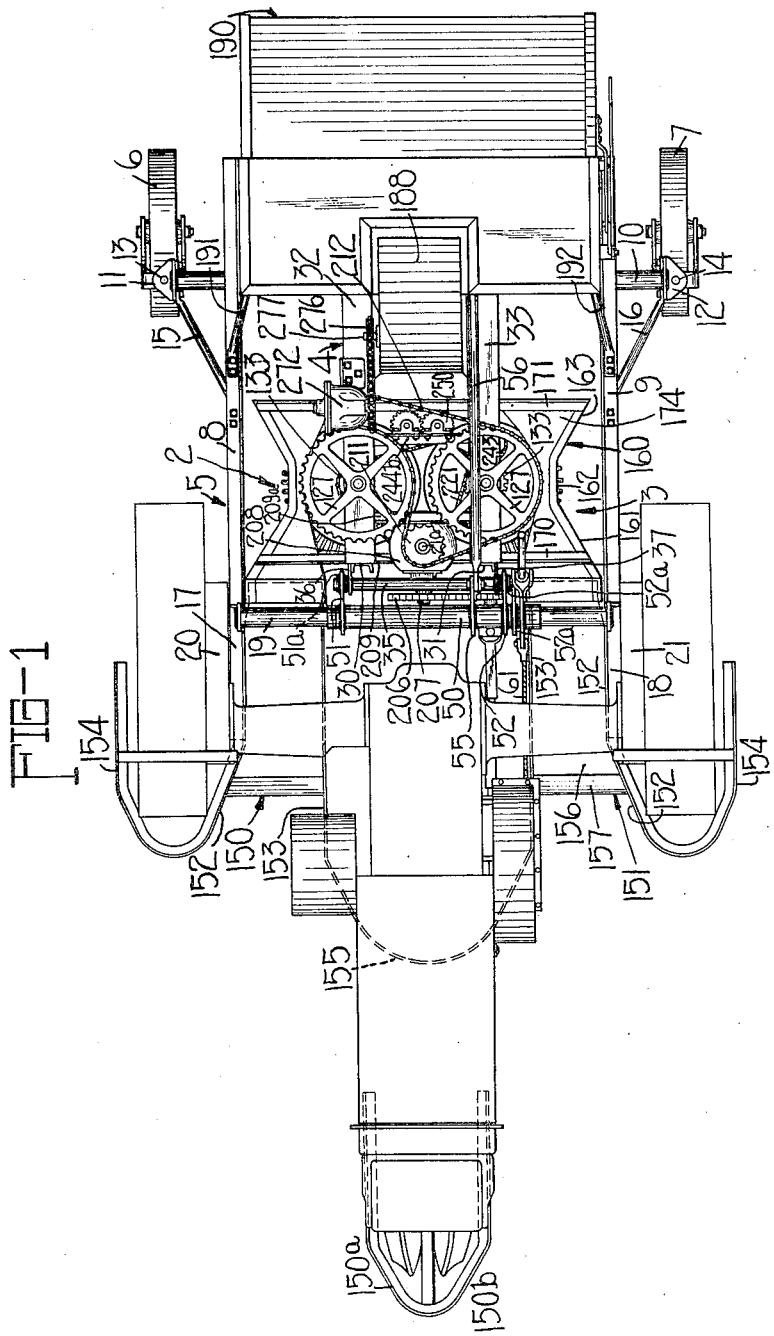

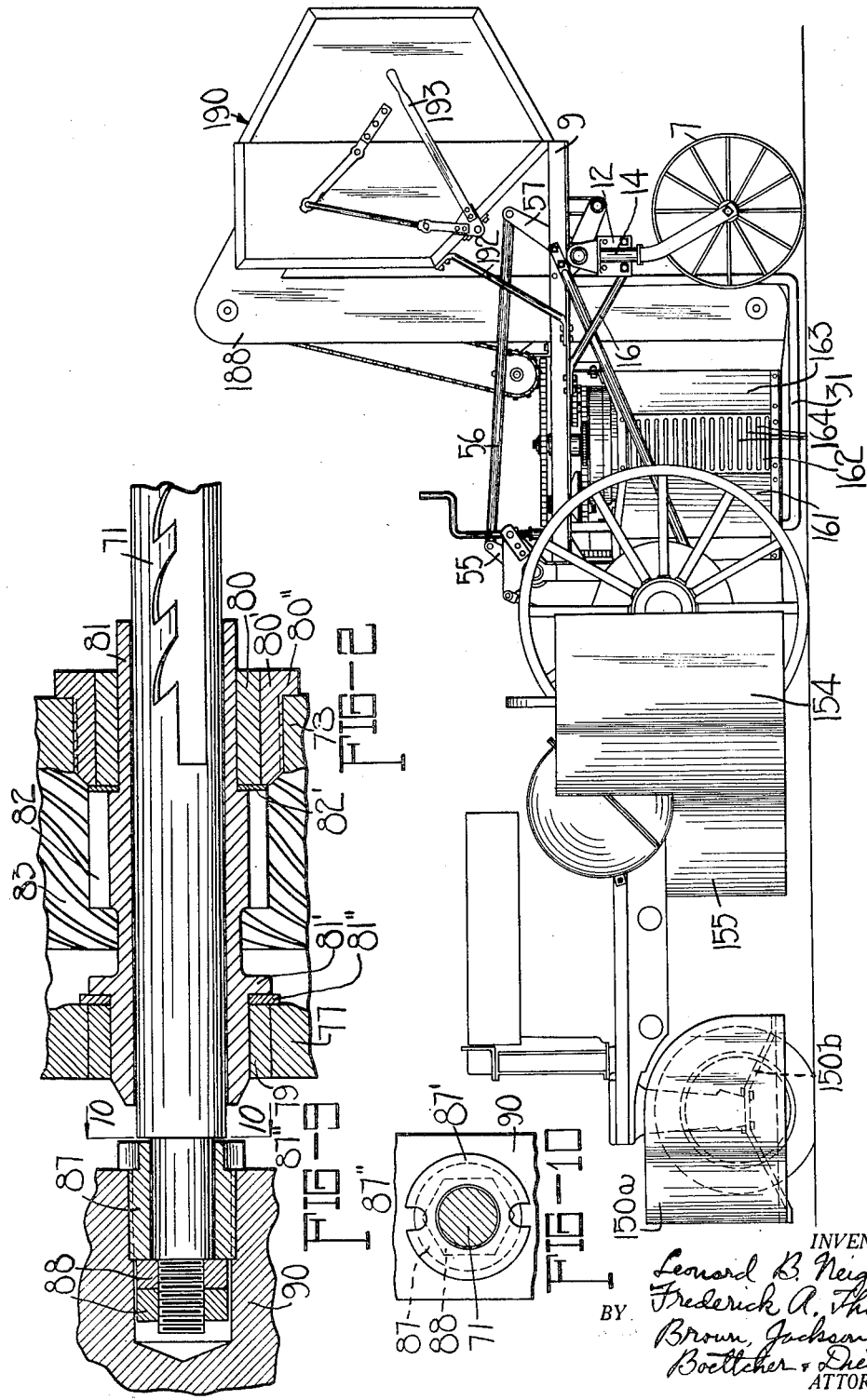

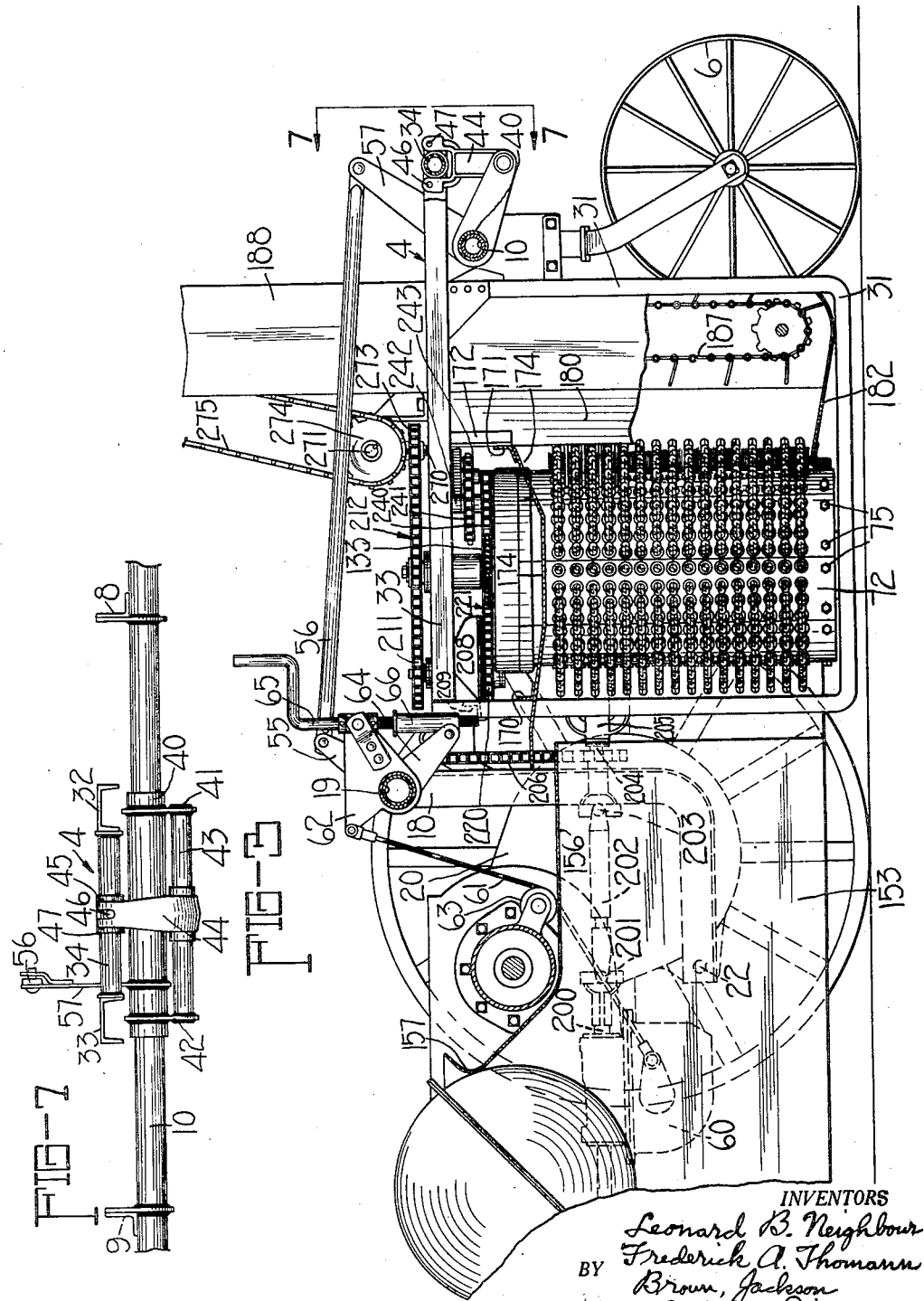

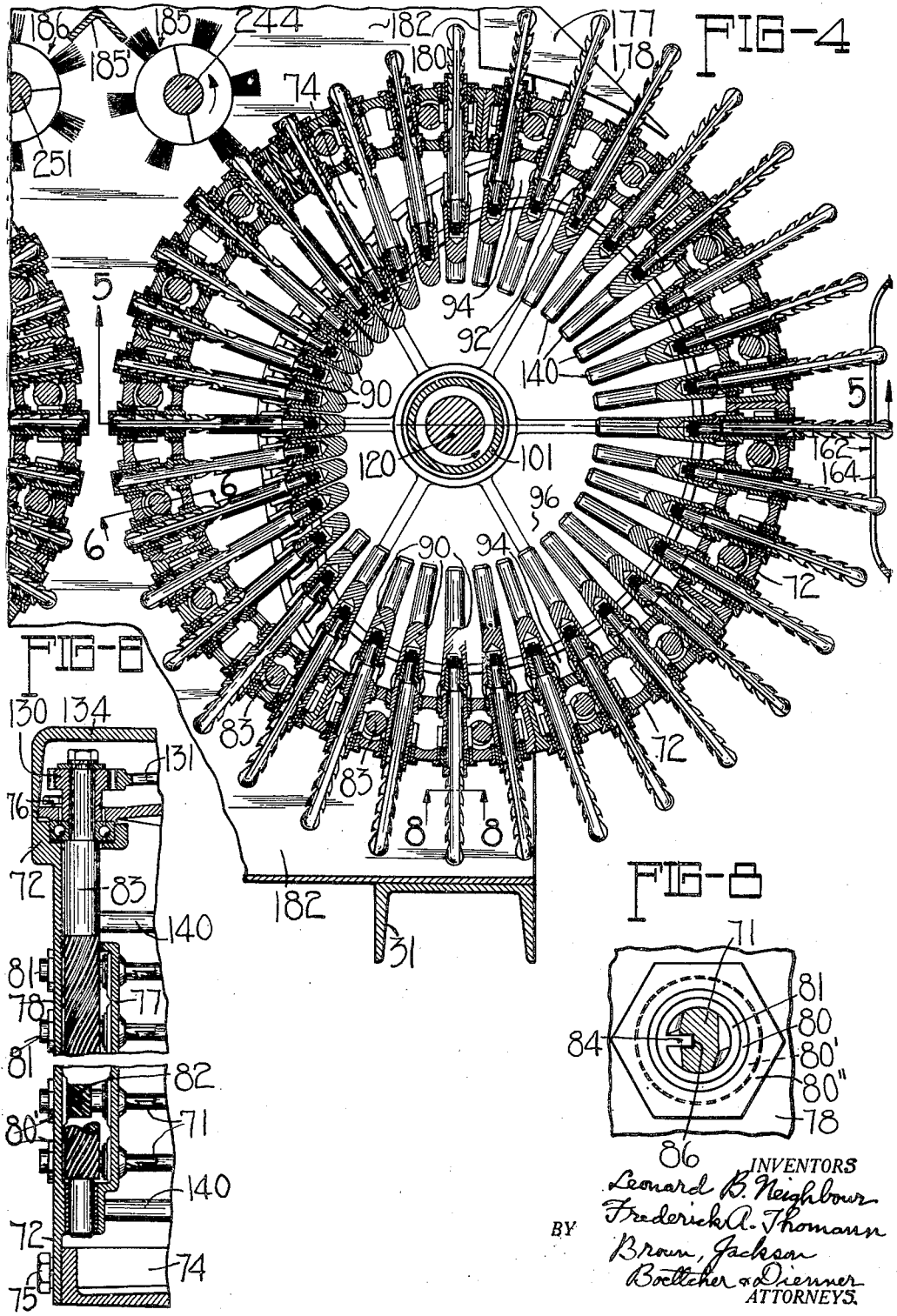

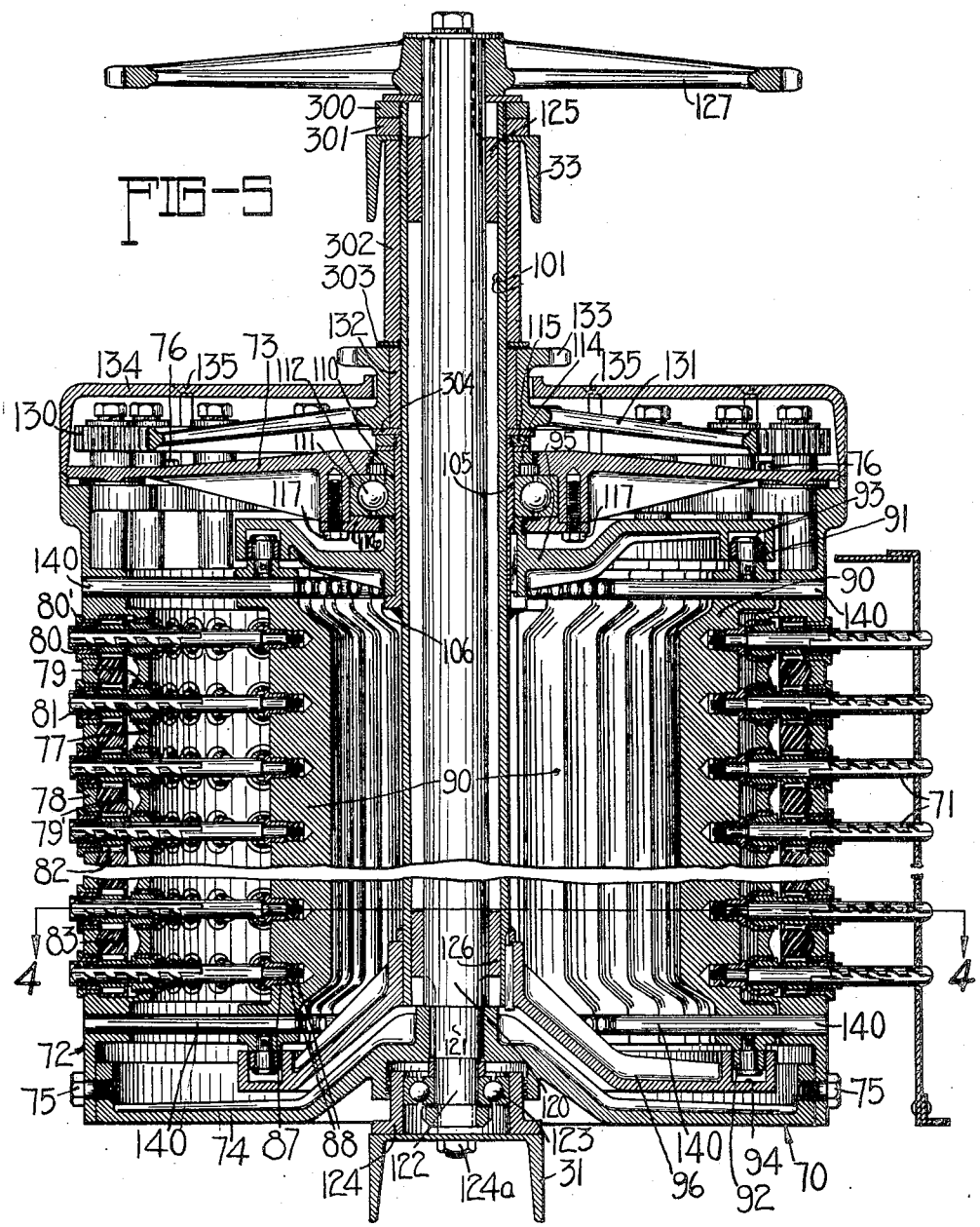

Patented Feb. 13, 1934

1,946,542

UNITED STATES PATENT OFFICE 1,946,542

COTTON HARVESTER

Leonard B. Neighbour, Moline, and Frederick A. Thomann, East Moline, Ill., assignor to Deere & Company, Moline, Ill., a corporation of Illinois Application July 30, 1932. Serial No. 626,396

29 Claims. (Cl. 56—14)

The present invention relates generally to agricultural machines and is particularly concerned with the provision of a new and improved cotton harvester of the needle type.

Various attempts have been made from time to time to develop a commercially successful agricultural implement in the form of a machine to harvest cotton from the standing rows of cotton plants, but generally such machines have not been successful in a practical way because of their complexity and because they do not pick clean. One of the principal purposes of the present invention is the provision of a cotton harvester which is at once simply and sturdily constructed and which, nevertheless, is so provided with picking elements operatively adequate to ensure a clean job. More specifically, it is the purpose of the present invention to provide a cotton harvester of the needle type wherein a pair of rotatable needle drums are provided and in which is disposed a sufficient number of picking needles to ensure the complete removal of cotton from the plants. To this end, the present invention contemplates arranging the picking needles radially of the drum and to shift the needles axially of themselves into and out of projected cotton picking position, and to drive the needles by means which is arranged peripherally of the drum and which remains in that position even when the needles are withdrawn into the drum in retracted position. By virtue of this construction, there is no interference between the various parts of the needle driving means when the needles are withdrawn radially into the drum, as would be the case where the needle driving means is associated with the innermost ends of the needles themselves. Thus, by arranging the needle driving means at the periphery of the drum, sufficient space is provided so that an adequate number of needles may be mounted on the drum, thereby insuring sufficient picking means to remove all of the cotton from the cotton plants.

Another object of the present invention is the provision of a cotton harvester of this type which is adapted to be propelled by and driven from a farm tractor of conventional construction and wherein the supporting frame means for the picking units is of simple sturdy construction and easily attached and removed from the tractor.

Another important object of the present invention is an improved drum construction for cotton harvesters of the needle type. This improved drum construction, according to the principles of the present invention, embodies a double wall construction and the disposition of the needle driving means between the walls where adequate lubrication may be provided for the driving means but without any likelihood of lubricant inadvertently coming into contact with the needles themselves and interfering with the operation of the latter in their cotton picking function. This feature of the present invention is of importance, particularly where the needles are arranged to be projected into and retracted from cotton picking position and to be rotated during that operation by some form of power or other driving means.

Another feature of importance of the present invention is the provision of new and improved mounting means for the needles which is so arranged that any one of the needles may be individually and conveniently removed from the drum without disturbing or interfering with the provision or operation of the remaining needles.

Still further, another object of the present invention has to do with the arrangement of the picker drums and the picking needles when the latter are passing into and through their active or operating positon. According to the principles of the present invention two picker units are provided, each comprising a rotatable picker drum having needles thereon which are withdrawn into the respective drums in their inoperative position and, when in operative position, are disposed generally in a transverse vertical plane and positioned between the two rows being picked. Thus, briefly, the present invention contemplates a construction wherein two picking units are provided in which the picking elements are projected laterally outwardly in operative association with the plants of two rows between which the units are disposed. In this connection, the present invention also contemplates the provision of plant guiding means in the form of tunnels to ensure that the plants shall be guided into operative association with the picking elements and into the picking zone thereof. In this latter feature it is important to note that the principles thereof may be embodied in a harvester which is arranged to pick only one row at a time, and likewise the same principles may be embodied in a machine which is capable of harvesting more than two rows. At the present time, however, the preferred construction is that wherein two picking units are disposed between the two rows to be harvested, with the picking elements carried by the drums adapted to be projected laterally outwardly of the harvester and into operative association with the plants of the two rows.

Another feature of importance of the present invention, particularly in connection with a two row harvester, is the provision of a central elevator into which the cotton from the two picking units is directed, together with the additional feature of hopper means carried by the harvester to receive the cotton discharged from the elevator.

A further feature of importance is the frame construction for supporting the picking units. Generally speaking, the frame construction is extremely simple, the picking units being supported in a framework which is suspended from a main frame, the latter being pivotally connected with the tractor for vertical movement but rigid with respect to relative lateral movement and supported at its rear on caster wheels. By virtue of this construction a very compact machine is provided, whereby it is possible to utilize a relatively simple supporting frame.

These and other objects of the present invention will be apparent to those skilled in the art after a consideration of the following detailed description of the preferred construction, taken in conjunction with the accompanying drawings illustrating said construction.

In the drawings:

Figure 1 is a top plan view illustrating a two row cotton picker of the needle type constructed according to the principles of the present invention and operatively associated with a farm tractor of the conventional wide tread type;

Figure 2 is a side elevation of the machine illustrated in Figure 1;

Figure 3 is an enlarged side elevation, certain parts being in section and other parts being broken away in order to better illustrate one of the picking units;

Figure 4 is an enlarged horizontal section taken through one of the picker drums, corresponding to a section taken along the line 4—4 of Figure 5;

Figure 5 is a vertical section taken along the line 5—5 of Figure 4;

Figure 6 is a fragmentary section taken along the line 6—6 of Figure 5;

Figure 7 is a fragmentary rear elevation of certain of the frame members and the connection between the rear portions of the main and auxiliary frames, Figure 7 corresponding to a view taken along the line 7—7 of Figure 3;

Figure 8 is an enlarged detail corresponding to a section taken along the line 8—8 of Figure 4 and illustrating the splined connection between one of the needles and its associated rotatable sleeve;

Figure 9 is an enlarged sectional view taken longitudinally through one of the picking needles and showing in detail the mounting means for the latter, and particularly the manner in which each of the needles is supported in a manner to be individually removable from the picking units:

Figure 10 is a section taken along the line 10—10 of Figure 9;

Figure 11 is a horizontal section looking downwardly on the two picking units and illustrating the driving connections for the latter, Figure 11 illustrating a slightly modified form of construction embodying rotatable members associated with the picking drums to aid in directing the plants thereto;

Figure 12 is a section taken along the line 12—12 of Figure 11; and

Figure 13 is a fragmentary detail illustrating the construction of a modified form of rotatable member associated with one of the picking drums.

Referring now more particularly to Figures 1, 2 and 3, the illustrated machine is a two-row tractor drawn machine comprising two picking mechanisms 2 and 3. The two mechanisms are supported in an auxiliary framework 4 supported from a main frame 5 relative to which it may be vertically raised and lowered. The main frame 5 is pivotally connected to the tractor on horizontal pivots at its front end and is supported at its rear end on a pair of caster wheels 6 and 7. This framework may, therefore, rise and fall with respect to the tractor about its front vertical pivots but is rigid with respect to the tractor insofar as lateral movement is concerned.

The main frame 5 comprises a pair of longitudinally extending side members 8 and 9 which are connected together at their rear by means of a transverse pipe 10 (see Fig. 7). Castings 11 and 12 are supported on the outer ends of pipe 10 and are provided with vertical sleeves 13 and 14 in which the spindles of caster wheels 6 and 7 are journaled. Braces 15 and 16 are provided between castings 11 and 12 and frame members 8 and 9.

At their forward ends, frame members 8 and 9 are fixed to L-shaped frame members 17 and 18. Members 17 and 18 are connected together at their upper end by means of the transverse pipe 19 and are pivotally connected to the lower front portions of chain housings 20 and 21 of the tractor by means of pivot bolts 22. Since the frame members 8 and 9 are rigidly connected together at their rear ends by pipe 10 and are rigidly connected at their forward ends with the L-shaped members 17 and 18 to the transverse pipe 19, it will be seen that a simple and sturdy frame construction is provided. This frame construction or main frame is capable of vertical swinging movement relative to the tractor about its pivot axis as defined by the pivots 22, but because the pivotal connection is secured by laterally spaced means the main frame is laterally rigid with respect to the tractor. In addition, the close association of the frame members 17 and 18 with the chain housings of the tractor contributes to this lateral rigidity.

The auxiliary frame 4 is provided for directly supporting the picker units, and this auxiliary frame is capable of vertical movement relative to the main frame 5. The auxiliary framework 4 comprises a pair of U-shaped members 30 and 31 disposed in spaced longitudinal vertical planes, the upper ends of the legs of which are connected together by means of longitudinal members 32 and 33. Members 32 and 33 are connected together at their rear ends by means of cross pipe 34, (see Fig. 7).

The rear end of the framework 4 is supported from the main frame by a short pipe 40 journaled on pipe 10. A pair of arms 41 and 42 are fixed to the ends of pipe 10. A cross member 43 connects the ends of arms 41 and 42 and has an arm 44 journaled thereon. The upper end of arm 44 is forked and embraces a sleeve 45 journaled on cross pipe 34. Each prong of the upper end of arm 44 is slotted, in which slots lugs 46, disposed on opposite sides of sleeve 45, rest. Pins 47 are inserted through suitable openings in the upper slotted ends of the forks of the arm 44 for the purpose of holding the lugs 46 in place. By rotating sleeve 40, the rear end of framework 4 is raised or lowered.

The front legs of the U-shaped members 30 and 31 are fixed to a cross pipe 35, the connection being through brackets 36 and 37 which are fixed to the sides of members 30 and 31 and are welded to pipe 35, as best shown in Figure 1. The forward end of the auxiliary framework 4 is supported from the main frame 5 through connections comprising a pipe member 50 journaled on cross pipe 19. Pipe 50 is provided with a pair of arms 51 and 52, the ends of which are fixed to collars 51a and 52a journaled on cross members 35. The rocking of pipe member 50 raises or lowers the front end of framework 4. An upwardly extending arm 55 is also fixed to pipe 50 which is link-connected by means of a link 56 to an arm 57 fixed on pipe 40. Through this connection the two ends of framework 4 are raised and lowered simultaneously.

Pipe member 50 is rocked through a connection with the power lift 60 of the tractor. This connection comprises a cable 61, one end of which is connected to the crank arm of the power lift mechanism. The other end is connected to the bell crank 62 journaled on pipe 19. Cable 61 also passes over a roller 63 carried by the quill on the left side of the tractor housing the drive shaft. An arm 64 is fixed to the end of pipe member 50, the end of which is connected with bell crank 62 through crank screw 65 and threaded sleeve 66. By turning crank screw 65, pipe members 50 and 40 may be rocked a limited degree to adjust the height at which the picking mechanisms are carried in operation. When the power lift mechanism 60 is operated, pipe members 50 and 40 are rocked to a greater extent to lift the picking mechanisms to transport position.

The mechanism of each picking unit comprises a drum 70 in which the picking needles 71 are mounted, (see Figs. 4, 5 and 6). Each drum 70 comprises a series of stave sections 72 and a pair of drum heads 73 and 74. The sections 72 are connected to the lower drum head 74 by means of bolts 75 and to the upper drum head 73 by means of bolts 76.

The two drums 70 are supported from the frame members 32 and 33 respectively on sleeves 101. Each sleeve 101 is fixed at its upper end to its frame member and extends downwardly into the interior of the drum. Intermediate the ends of sleeve 101 a second sleeve 105 is fixed thereto, the latter sleeve having a flange 106 at its lower end. The hub of a cam plate 95 is mounted over sleeve 105 and is keyed thereto. The drum 70 is supported from the sleeve 101 through a roller bearing comprising an inner raceway 110, an outer raceway 111 and a series of rollers 112. The inner raceway 110 bears on the upper end of the hub of plate 95. A retaining ring 114 is provided which holds the inner raceway 110 in position, ring 114 being held in position by means of a nut 115 threaded over the upper threaded end of sleeve 105. The outer raceway 111 is disposed in a recess in head 73 and held by means of a retaining ring 116 held in position by means of cap screws 117. The weight of the drum, therefore, is supported from the head 73 through the raceway 111, rollers 112, inner raceway 110, hub of plate 95, flange of sleeve 105, and sleeve 101.

Drum 70 is maintained in a vertical position by means of its drive shaft 120 to the lower end of which the hub of drum head 74 is keyed. The reduced end 122 of shaft 120 is held in fixed lateral position by a roller bearing 123 confined in the inner circumference of the sleeve member 124 fixed to the lower horizontal portion of frame member 31 by bolts 124a.

The means by which the sleeve 101 is fixed to member 33 includes two large nuts 300 and 301 threaded on the upper end of sleeve 101. Member 33 is clamped between nut 301 and a spacing sleeve 302 embracing sleeve 101. Sleeve 302 bears on a washer 303 which bears on bearing bushing 132. Bearing 132 rests upon a washer 304 which rests on top of sleeve 105. Thus, tightening the nut 301 pulls the sleeve member 101 upwardly and the flange 106 of the sleeve 105, fixedly secured as by welding or the like to the sleeve 101 and bearing against the parts just mentioned, forces the spacing sleeve 302 tightly against the under surface of the web of the frame member 33. Drive shaft 120 is journaled within sleeve 110 in bearings 125 and 126. To the end of shaft 120 a sprocket 127 is keyed. Imparting rotation to shaft 120 causes the rotation of drum 70.

Each section 72 of the drum comprises an inner wall 77 and outer wall 78 in which are provided four vertical rows of aligned openings. In these openings bearings 79 and 80 are provided. Bearings 79 are pressed into the opening in the inner wall 77 and bearings 80 are pressed into threaded sleeves 80' screwed into the openings in the outer wall 78, (see Fig. 9). Sleeves 80' are provided with hexagonal heads 80'' to facilitate their removal. In these bearings sleeves 81 are journaled each sleeve having formed thereon spiral gear teeth 82. Sleeves 81 are maintained in position by flanges 81' which bear against washers 81'' and by washers 82' interposed between teeth 82 and the end of sleeves 80'.

Slidably disposed in the sleeves 81 are the picking needles 71. The sleeves 81 are provided with keys 84 which engage in keyways 86 formed in the needles, through the agency of which rotation of the sleeves 81 imparts rotation to the needles 71, as best shown in Figure 8. The rear ends of needles 71 are rotatably supported in bearings 87 provided in vertical standards 90, one such standard being provided for each vertical row of needles. Bearings 87 are screwed into threaded borings in the standards. The needles are held in position in the standards by the two lock nuts 88 threaded on the threaded end of the needles, one of the lock nuts bearing against the rear end of the bearing 87. Bearings 87 are provided with flanges 87' having notches 87'' for receiving a tool to facilitate the insertion and removal thereof.

The diameter of the openings in wall 78 into which sleeves 80' are screwed is a little greater than the outside diameter of teeth 82, flange 81', and washer 81''. The diameter of the opening in bearing 79 is a little greater than the diameter of the flange 87' on sleeve 87. This construction makes it possible to remove or insert each needle individually, the procedure to remove a needle being as follows: Unscrew sleeve 80', then strip the sleeve over the end of the needle; next remove the sleeve 81, together with the pinion 82 from the drum section 72; then over the needle place a tool comprising a pipe having lugs on the end to engage the notches 87'' and unscrew the sleeve 87 by turning the tool. Then the needle with sleeve 87 loosely thereon may be withdrawn from the drum through the bearing 79. These steps are followed in reverse order when placing the needle in position.

The means for driving the needles will now be described:

Between each pair of vertical rows of sleeves 81, a drive shaft 83 is positioned meshing with the teeth 82 on the sleeves on both sides of the shaft. By rotation of drive shafts 83, sleeves 81 are rotated in bearings 79 and 80, those in one vertical row rotating in the opposite direction from those in the adjacent vertical row.

Vertical shafts 83 are rotated through pinions 130, provided at their upper ends. Each of these pinions meshes with a large drive gear 131 journaled over a bearing 132 provided on sleeve 101. A driving sprocket 133 is formed integral with the hub of gear 131. Driving gear 131 and pinions 130 are covered by means of a cover plate 134 formed in two half-sections and bolted to the drum 73 by means of set screws 135.

The standards 90 are provided at their upper and lower ends with rollers 91 and 92 which are confined in cam tracks 93 and 94 formed in plates 95 and 96 keyed to sleeve 101. As the plates 95 and 96 are held stationary, being fixed to the sleeve 101, standards 90 are forced radially inwardly and outwardly of the drum by reason of the shape of the cam tracks 93 and 94, to cause the needles to be projected outwardly and drawn inwardly of the drum 70 during the rotation thereof. The various positions of the needles and the shape of the cam tracks are best shown in Figure 4. Standards 90 in their inward and outward movements are guided by guide rods 140 carried by the drum sections 72 and extending inwardly of the drum and on which the standards are slidingly mounted.

To bring the cotton plants into picking relationship with the picking drums, tunnels 150 and 151 carried by the tractor are provided. These tunnels comprise an outer wall 152 and an inner wall 153. The outer wall is flared outwardly and is provided with a rearwardly extending portion 154 embracing the tractor drive wheel. The front ends of the walls 153 are connected together by the U-shaped portion 155. The two walls 152 and 153 are connected together along their upper edges by a top wall 156, the front end of which is flared upwardly and rearwardly as shown at 157, (see Figures 1 and 3).

A shield 150a is provided to deflect the plants away from the front truck of the tractor. This shield embraces the wheels of the truck and is supported by a bracket 150b fixed to the lower side of the wheel axle.

The inner wall 153 extends to within a short distance from the drums. The outer wall 152 overlaps with a wall 160 comprising an inwardly bent portion 161, a straight portion 162 and an outwardly flared portion 163. Wall 160 is supported from the framework 4 by means of two angle irons 170 and 171. Angle iron 170 is supported from the front leg of the U-shaped member 31 and angle iron 171 is supported from brackets 172 depending from the frame members 32 and 33, (see Figure 3). A top wall 174 is also provided which is supported from angle irons 170 and 171, its outer edge connecting with the upper edge of wall 160 and its inner edge being flared forwardly and rearwardly with the center, or throat portion closely following the curvature of the periphery of the drum. The portion 162 has a series of longitudinal slots 164 and is positioned adjacent the drum a distance somewhat less than the length of that part of the needle projecting outwardly of the drum, so that the needles will project through the slots 164 a slight distance.

The plants are guided between the walls 152 and 153 of the tunnels and by the wall 160 they are compressed against the side of the picking drums. In the rotation of the drums in the direction shown by the arrows, the needles are projected laterally outwardly into the plants, picking the cotton therefrom. Laden with cotton, the needles then pass between blocks 177, (see Figure 4). Blocks 177 are disposed between horizontal rows of needles and have inclined faces 178 which function to strip the plant from the needles. Passing between blocks 177 the needles enter the space defined by end walls 180 of the blocks 177 and the bottom wall 182. At this point the needles are drawn inwardly of the drum and the cotton stripped therefrom. Such of the cotton as adheres to the drum surface is removed therefrom by two vertical brushes 185 and 186, positioned to brush the outer periphery of the drums as shown in Figure 4. A vertical member 185' of V-shaped cross section is provided, the edges of which engage the brushes 186 to remove any cotton that tends to adhere to the brushes. Cotton stripped from the needles and brushed from the drum by the brushes 185, 186 falls upon the bottom wall 182 from where it is picked up by the flight elevator 187, or it may be projected directly into the elevator, the front side thereof being open up to the angle 171. Elevator 187 is disposed in the vertically extending housing 188 supported by the two frame members 32 and 33. Elevator 187 elevates the cotton and deposits it into the hopper 190. Hopper 190 is supported at the rear of the machine on the two main frame members 8 and 9 and brace members 191 and 192.

Power for operating the mechanisms of the picker is derived from the power take-off shaft 200 on the tractor through connections including universal joint 201, telescopic connection 202 and universal joint 203 with the shaft 204 journaled in a bearing 205 supported on the front leg of the U-shaped frame member 31. Shaft 205 is connected by means of the chain and sprocket connection 206 with a shaft 207 journaled in the gear housing 208 supported from the framework 4 on the supporting members 209 and 209a connected to members 32 and 33. Shaft 207 is connected by means of bevel gears housed in housing 208 to a vertical shaft 210. A sprocket 211 is fixed to the upper end of shaft 210 around which the drive chain 212 is trained, the latter also being trained around large drive sprockets 127 of the two picking drums. Another sprocket 220 is fixed to the lower end of the shaft 210 over which a chain 221 is trained. Chain 221 is also trained around drive sprockets 133 of the picking drums through the rotation of which needle drive shafts 83 are rotated through gear 131 and pinions 130.

A double sprocket comprising sprocket 240 and sprocket 241 integrally connected through a common hub are journaled on a spindle 242 depending from frame member 33, (see Fig. 3). Drive chain 221 is trained around sprocket 240 to rotate the double sprocket. A drive chain 243 is trained over sprocket 241 and over a sprocket fixed to shaft 244 of brush 185 through which connection brush 185 is revolved in the direction shown by the arrow in Figure 4.

A gear 250 is fixed to shaft 244 above the sprocket 243 and meshes with a similar gear fixed to the upper end of shaft 251 of brush 186 through which drive connection brush 186 is rotated. At their upper ends, shafts 244 and 251 are journaled in bearings 244a and 251a mounted on angle iron 244b fixed to members 32 and 33. At their lower ends they are journaled in bearings supported on the bottom 182.

The elevator 187 is driven through a driving connection including a short vertical shaft 270 and a short horizontal shaft 271 connected by means of a pair of bevel gears housed in housing 272 mounted on frame member 32. A sprocket 273 is fixed to the lower end of shaft 270 around which the drive chain 212 is trained. A sprocket 274 is keyed to the shaft 271 and is chain connected by means of chain 275 with a sprocket 276 fixed to the end of the upper shaft 277 of elevator 187.

In Figures 11 and 12 a modification of the machine described is shown. The modification comprises the substitution of a cylinder 400 to take the place of the wall 162 for directing and compressing the cotton plants against the picking needles. Cylinders 400 are mounted on shafts 401 journaled in bearings 402 and 403. Bearings 402 are supported from the angle iron 404 connecting the cross angle members 170' and 171' which correspond to members 170 and 171 of the machine described above. Bearings 403 are supported from an angle iron 405 which in turn is supported from the extended ends of angle members 170' and 171' by inwardly inclined supporting members 406.

Cylinders 400 are rotated by power, the rate of rotation thereof being such that the peripheral velocity of the drums will be substantially the same as the peripheral velocity of the ends of the picking needles when extended. However, the cylinder 400 might be rotated so that the peripheral velocity is somewhat greater or somewhat less than the peripheral velocity of the ends of the picking needles, in order to give the plants a certain amount of lateral movement with respect to the needles when the needles are in contact therewith. This will increase the picking efficiency of the needles, inasmuch as they will be moved over a greater area relative to the plant.

Cylinder 400 is provided with a plurality of circumferential grooves 407 which are spaced to receive the ends of the picking needles.

The driving connections for the drums comprise a pair of bevel gears 408 fixed to shaft 401, and 409 fixed to the end of shaft 410. Shaft 410 is journaled in a bearing provided in housing 411 housing the bevel gears, and a bearing supported by bracket 412 fixed to the angle member 170'. The forward end of shaft 410 is chain connected by means of a chain and sprocket connection 413 with shaft 207. If desired, the cylinder 400 instead of being provided with the grooves 407 might be provided with a series of circumferential rows of pins 507 as shown in Figure 13.

It will at once be apparent that the structural details of the present invention are susceptible to various modifications, and that the present invention is not to be limited to the specific construction shown and described, but that in fact, widely different means may be employed in the practice of the broader aspects of our invention.

What we claim, therefore, and desire to secure by Letters Patent is:

1. A cotton harvester adapted to be propelled by a tractor or the like, comprising, in combination, a supporting frame including longitudinally disposed frame bars connected together in rigid relation with respect to each other and connected at their forward ends with the tractor at opposite sides thereof for vertical movement relative thereto about a transverse axis, said pivotal connection being established at two spaced points on the tractor whereby the frame is laterally rigid with respect thereto, caster wheel means supporting one end of said frame, and cotton harvesting means carried by said frame between said longitudinally disposed frame bars.

2. A cotton harvester comprising, in combination, a tractor, an implement frame including a pair of longitudinally disposed frame bars connected together in rigid relation with respect to each other and pivotally connected at their forward ends, respectively, with opposite sides of the tractor on a transverse axis whereby the frame is capable of vertical movement relative to the tractor and is prevented from moving laterally relative thereto, caster wheels at the rear ends of said frame bars for supporting the rear of said implement frame, and an operating unit carried by the frame between said longitudinally disposed frame bars and shiftably supported by said implement frame adjacent the front and rear ends of said bars and capable of substantially vertical movement relative thereto.

3. An agricultural machine adapted to be propelled by a tractor comprising, in combination, an implement frame including laterally spaced forwardly extending frame bars, a transverse frame member connected therewith near the forward ends thereof, means pivotally mounting said bars and said member on the tractor, a second transverse member connected with the rear ends of said frame bars, said frame being capable of vertical movement relative to the tractor about its pivotal axis but held by said pivotal connections against lateral angular displacement, an auxiliary frame shiftably connected with said implement frame and comprising longitudinal frame members and generally U-shaped members connected with and depending from the longitudinal members of said auxiliary frame, operating units rotatably supported upon the members of said auxiliary frame, and means operable from the tractor for controlling the vertical position of the auxiliary frame relative to said implement frame.

4. An agricultural machine adapted to be propelled by a tractor having a power lift, said machine comprising, in combination, an implement frame including laterally spaced forwardly extending frame bars, a transverse frame member connected therewith near the forward ends thereof, means pivotally mounting said bars and said member on the tractor, a second transverse member connected with the rear ends of said frame bars, said frame being capable of vertical movement relative to the tractor about its pivotal axis but held by said pivotal connections against lateral angular displacement, a sleeve rotatably mounted on each of said transverse members, arms extending from said sleeves, an auxiliary frame supported from said arms and comprising longitudinal frame members and generally U-shaped members connected with and depending from the longitudinal members of said auxiliary frame, operating units rotatably supported upon the members of said auxiliary frame, and means connected with the power lift of the tractor and adapted to rock said sleeves for controlling the vertical position of the auxiliary frame relative to said implement frame.

5. An agricultural machine comprising, in combination, an implement frame, a pair of cotton picking units carried thereby, each unit consisting of a rotatable drum carrying a plurality of picking needles and means for removing the cotton therefrom, said units being spaced laterally relative to each other on said frame, means carried by said frame for receiving the cotton removed by said units, and elevator means disposed in a plane between said units and adapted to receive the cotton from both of said units.

6. An agricultural machine comprising, in combination, a main supporting frame, an auxiliary frame movably supported by said main frame, a pair of cotton picking units supported by said auxiliary frame, each of said units including a vertically disposed picker drum provided with cotton picking means and means for removing the cotton therefrom, said units being disposed on said auxiliary frame in laterally spaced relation, common elevator means carried by the auxiliary frame and adapted to receive the cotton picked by both of said units, and hopper means carried by the main frame and adapted to receive the cotton discharged by said elevator means.

7. In a cotton harvester, an implement frame, a picker drum mounted for rotation on said frame, a plurality of picker needles arranged on said drum in radial relation, said needles being rotatable relative to the drum and shiftable axially radially inwardly and outwardly of the drum, and means carried by said drum adjacent the periphery thereof for rotating said needles both in their projected position and in their retracted position.

8. In a cotton harvester, a main frame, a picker drum supported for rotation thereon, a plurality of axially shiftable needles carried by the periphery of the drum and disposed in substantially radial relation with respect thereto, means for rotating said drum, and means carried by the periphery of the latter for rotating said needles in their retracted and in their projected position relative to the drum.

9. In a cotton harvester, a main frame, a picker drum supported for rotation thereon, a plurality of needles rotatably carried by the periphery of the drum, said needles being shiftable radially inwardly and outwardly of the drums, and gear means carried adjacent the radially outer periphery of said drum for rotating said needles.

10. In a cotton harvester, an implement frame, a picker drum supported for rotation thereon, a plurality of sleeves carried by the drum for rotation relative thereto, a plurality of picker needles supported in said sleeves for rotation therewith and shiftable axially with respect thereto, means for simultaneously rotating all of said sleeves and the associated needles, and means connected with the radially inner ends of said needles for shifting the latter in said sleeves.

11. In a cotton harvester, a main frame, a picker drug rotatably supported thereon, a plurality of rotatably mounted sleeves carried by the periphery of said drum, said sleeves being arranged in radial relation on said drum, means carried by the periphery of the drum and operatively associated with adjacent sleeves for driving the latter in opposite directions in pairs, axially retractable picker needles non-rotatably carried by said sleeves, and means connected with the inner ends of said needles for projecting and retracting the latter.

12. In a cotton harvester, a main frame, a picker drum rotatably supported thereon, a plurality of rotatably mounted sleeves carried by the periphery of said drum, said sleeves being arranged in radial relation on said drum, means carried by the periphery of the drum and operatively associated with adjacent sleeves for driving the latter in opposite directions in pairs, axially retractable picker needles non-rotatably carried by said sleeves, a plurality of guide rods carried by said drum and extending radially thereof, a plurality of standards slidably supported upon said rods and rotatably connected with the radially inner ends of the needles for positioning the latter, and means for shifting said standards to project and retract said needles.

13. In a cotton harvester, a supporting frame, a picker drum rotatably mounted thereon, said drum comprising radially spaced inner and outer walls, a plurality of rotatable sleeves supported in radial position by said inner and outer walls, inner and outer bearing means carried by the latter to provide for rotation of said sleeves, means disposed between said inner and outer walls for rotating said sleeves, and picker needles carried by said sleeves for rotation therewith.

14. In a cotton harvester, a supporting frame, a picker drum mounted for rotation thereon, means carried by said drum and providing a peripheral series of compartments having radially inner and outer walls, radially disposed sleeves supported by said inner and outer walls, inner and outer bearing means for each of said sleeves, gear means mounted within said compartments and arranged to drive said sleeves, said compartments providing lubricant recesses for lubricating said driving means, and picker needles carried by said sleeves out of contact with the lubricant in said compartments.

15. In a cotton harvester, a supporting frame, a picker drum supported for rotation thereon, a plurality of radially disposed sleeves journaled in the peripheral portion of said drum, bearing means for said sleeves, each bearing means being removable from the drum to permit the individual removal of said sleeve, a plurality of needles carried by said sleeves for rotation therewith, each of said needles being axially shiftable in its supporting sleeve, a plurality of standards for shifting said needles, the inner ends of the latter being rotatably mounted in said standards, bearing means therefor removably associated with said standards, said bearing means being removable from said standards so that the needle and its associated bearing means may be removed from the drum by the removal of the associated sleeve and its bearing means from the drum.

16. In a cotton harvester, a supporting frame, a picker drum rotatably mounted thereon and comprising spaced radially inner and outer walls, a plurality of radially disposed sleeves journaled for rotation in said inner and outer walls, bearing means for each of said sleeves comprising an inner bearing member and an outer bearing member, said bearing members being removable from the inner and outer walls, respectively, of said picker drum and the outer bearing member being of greater diameter than the inner bearing member, thereby permitting the removal of the inner bearing member through the opening for the outer bearing member, a plurality of picker needles supported for rotation with said sleeves and shiftable axially thereof toward and from projected position, and means including a plurality of shiftable standards for shifting said needles, each of the latter being connected with said standards by bearing means removably connected with the standards and dimensioned to pass through the opening for the inner of said bearing members, whereby each picker needle may be individually removed by the removal of the associated sleeve and the subsequent removal of the bearing means for the inner end of the needle.

17. An agricultural machine comprising, in combination, a tractor having a power lift, an implement frame pivotally connected with the tractor on a transverse axis whereby the frame is capable of vertical movement relative to the tractor and is prevented from moving laterally relative thereto, ground engaging means supporting the rear of said implement frame, an operating unit shiftably supported by said implement frame and capable of movement relative thereto, and connections from said power lift to said unit for shifting the latter relative to the frame.

18. An agricultural machine comprising, in combination, a tractor having a power lift, an implement frame pivotally connected with the tractor on a transverse axis whereby the frame is capable of vertical movement relative to the tractor and is prevented from moving laterally relative thereto, caster wheel means supporting at least a portion of said implement frame, an operating unit supported by said frame for vertical movement relative thereto, and connections from said power lift to said unit for raising and lowering the latter relative to the frame.

19. An agricultural machine comprising, in combination, a tractor having supporting wheels, an implement frame pivotally connected with the tractor on a transverse axis whereby the frame is capable of vertical movement relative to the tractor and is prevented from moving laterally relative thereto, and operating means carried by said frame and comprising cotton picking drums carried by said frame closely adjacent said tractor supporting wheels, whereby the latter serve as gauging means for said operating means.

20. An agricultural machine comprising, in combination, a tractor having supporting wheels, an implement frame pivotally connected with the tractor on a transverse axis whereby the frame is capable of vertical movement relative to the tractor and is prevented from moving laterally relative thereto, ground engaging means supporting at least a portion of said implement frame and spaced apart laterally to correspond with the spacing of said tractor supporting wheels, and operating means carried by said frame and comprising cotton picking drums carried by said frame closely adjacent said tractor supporting wheels, whereby the latter serve as gauging means for said operating means.

21. An agricultural machine adapted to be propelled by a tractor or the like, comprising, in combination, a supporting frame pivotally connected with the tractor for vertical movement relative thereto about a transverse axis, said pivotal connection being established at two spaced points on the tractor whereby the frame is laterally rigid with respect thereto, crop receiving means carried by said supporting frame, an operating unit carried by said frame, and means for conveying the crop from said operating unit to said crop receiving means.

22. An agricultural machine adapted to be propelled by a tractor or the like, comprising, in combination, a supporting frame pivotally connected with the tractor for vertical movement relative thereto about a transverse axis, said pivotal connection being established at two spaced points on the tractor whereby the frame is laterally rigid with respect thereto, crop receiving means carried by said supporting frame, operating units carried by said frame and comprising laterally spaced cotton picking drums, and means for conveying cotton from both of said drums to said crop receiving means.

23. A cotton picking machine comprising, in combination, a supporting frame, a picker drum rotatably supported thereon, a plurality of picking needles supported by said drum for rotation relative thereto about substantially radial axes, and means for directing plants toward said picking needles including means serving as a movable wall and means for moving the same.

24. A cotton picking machine comprising, in combination, a supporting frame, a picker drum rotatably supported thereon, a plurality of picking needles supported by said drum for rotation relative thereto about substantially radial axes, and means for feeding plants to the picking needles including a movable wall having portions adapted to pass closely adjacent said needles.

25. A cotton picking machine comprising, in combination, a supporting frame, a picker drum rotatably supported thereon, a plurality of picking needles supported by said drum for rotation relative thereto about substantially radial axes, and means for feeding plants to the picking needles including a movable wall having portions adapted to pass in between certain of the picking needles.

26. A cotton picking machine comprising, in combination, a supporting frame, a picker drum supported for rotation thereon, a plurality of picking needles supported by said drum for rotation relative thereto about substantially radial axes, and means including a rotatable drum disposed adjacent the path of movement of said needles for directing plants thereto.

27. A cotton picking machine comprising, in combination, a supporting frame, a picker drum supported for rotation thereon, a plurality of picking needles supported by said drum for rotation relative thereto about substantially radial axes, means including a rotatable drum disposed adjacent the path of movement of said needles for directing plants thereto, and means for driving said last named drum.

28. A cotton picking machine comprising, in combination, a supporting frame, a picker drum supported for rotation thereon, a plurality of picking needles supported by said drum for rotation relative thereto about substantially radial axes, and means including a rotatable drum disposed adjacent the path of movement of said needles for directing plants thereto and having a plurality of grooves formed to receive the radially outer ends of said needles.

29. A cotton picking machine comprising, in combination, a supporting frame, a picker drum supported for rotation thereon, a plurality of picking needles supported by said drum for rotation relative thereto about substantially radial axes, and means including a rotatable drum disposed adjacent the path of movement of said needles for directing plants thereto and having a plurality of pins adapted to pass in between certain of said needles.

LEONARD B. NEIGHBOUR.
FREDERICK A. THOMANN.